United States Patent Office 3,225,103
Patented Dec. 21, 1965

3,225,103
4-PHOSPHORINANONE-1-SULFIDES
Richard Parke Welcher, Old Greenwich, Conn., assignor to American Cyanamid Company, New York, N.Y., a corporation of Maine
No Drawing. Filed Dec. 22, 1961, Ser. No. 161,438
2 Claims. (Cl. 260—606.5)

The present invention relates to organophosphorus compounds and methods for preparing same. More particularly, the instant discovery relates to 4-phosphorinanone derivatives of the formulae:

(A)
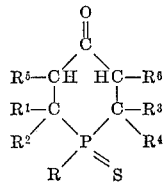

(B)
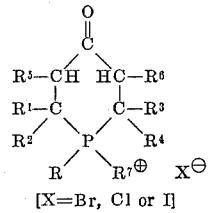
[X=Br, Cl or I]

(C)
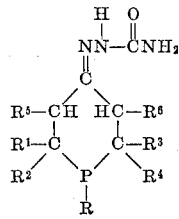

(D)
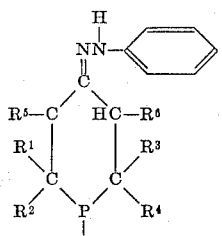

(E)
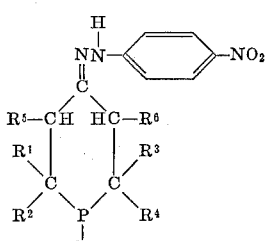

(F)
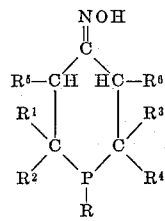

R in the above formulae represents a member selected from the group consisting of substituted and unsubstituted, branched and straight chain alkyl ($C_1$–$C_{18}$), substituted and unsubstituted cycloalkyl, substituted and unsubstituted aryl; $R^1$, $R^2$, $R^3$ and $R^4$ each represent a member selected from the group consisting of hydrogen, lower alkyl, phenyl, chloro-substituted phenyl, lower alkyl-substituted phenyl, cyclohexyl and lower alkoxyalkyl; $R^5$ and $R^6$ each represent a member selected from the group consisting of hydrogen, lower alkyl and phenyl; and $R^7$ represents alkyl having from 1 to 12 carbon atoms.

The 4-phosphorinanone reactants are prepared according to copending U.S. application, Serial No. 161,405, filed simultaneously herewith on December 22, 1961, now abandoned, by reacting a primary phosphine $RPH_2$ with a divinyl ketone (1,4-dien-3-one) of the formula

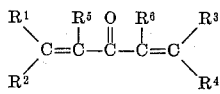

and recovering the corresponding phosphorinanone.

The primary phosphine reactant and the 1,4-dien-3-one reactant are best reacted at a temperature in the range of 80° C. to 200° C. and recovering the resulting 4-phosphorinanone product by volatilization, for example, at a reduced pressure in the range of 0 to 760 millimeters. Reaction is best carried out in a substantially inert atmosphere, such as in a nitrogen or helium atmosphere, or the like. No catalyst or solvent is necessary for the process contemplated herein.

Furthermore, the process is generally carried out at atmospheric pressure. Superatomspheric pressures as high as 700 pounds per square inch may likewise be used, particularly with low boiling reactants. Usually, however, very good results are achieved at atmospheric pressure.

Similarly, stoichiometric quantities of the reactants are generally employed. Nevertheless, small excesses of either reactant may be present without detrimentally affecting the nature of the reaction.

Generally, the reactants are heated for at least one hour, but this is not critical since incipient reaction occurs upon intermingling the reactants.

Typical primary phosphines useful for producing 4-phosphorinanone reactants within the purview of the instant discovery are phenylphosphine, cyclohexylphosphine, dodecylphosphine, isopropylphosphine, benzylphosphine, 2-ethoxyethylphosphine, 2 - cyanoethylphosphine, para-chlorophenylphosphine, methylphosphine, isobutylphosphine, ethylphosphine, propylphosphine, butylphosphine, pentylphosphine, hexylphosphine, octylphosphine, heptylphosphine, decylphosphine, undecylphosphine, heptadecylphosphine, octadecylphosphine, etc.

It follows from the above listing that typical substituents for primary alkyl phosphine are lower alkoxy, phenyl, cyano and the like. Typical substituents for primary aryl phosphine, such as phenyl phosphine, are halogen (e.g. Cl, Br, and I) lower alkyl, etc.

In other words, substituents which do not interfere with, enter into, i.e., are inert under the conditions of, the reaction for preparing 4-phosphorinanones are contemplated herein.

Among the divinyl ketones useful for preparing the 4-phosphorinanone reactants of the present invention are:

1,4-hexadien-3-one
1,4-heptadien-3-one
1,4-octadien-3-one
7-methyl-1,4-octadien-3-one
5-methyl-1,4-hexadien-3-one
5-methyl-1,4-heptadien-3-one
5-methyl-1,4-octadien-3-one
5-ethyl-1,4-heptadien-3-one
5-propyl-1,4-octadien-3-one
1-cyclohexylidene-3-buten-2-one 5-phenyl-1,4-hexadien-3-one
5-(2'-methoxyethyl)-1,4-nonadien-3-one
Divinyl ketone
2,5-heptadien-4-one
2-methyl-2,5-heptadien-4-one
2,8-dimethyl-3,6-nonadien-5-one
Phorone or 2,6 dimethyl-2,5-heptadien-4-one
2,7-dimethyl-3,6-octadien-5-one
4,6-dimethyl-3,7-diethyl-3,6-nonadien-5-one
2,4-dipropyl-1,4-pentadien-3-one
3,7-diethyl-3,6-nonadien-5-one
5-methyl-9-ethyl-4,7-tridecadien-6-one
Dibenzalacetone
4,4'-dichlorodibenzalacetone 4,4'-dimethyldibenzalacetone
Dicuminylideneacetone
2-chlorodibenzalacetone
3-chlorodibenzalacetone
4-chlorodibenzalacetone
2,3'-dichlorobenzalacetone
2,4'-dichlorobenzalacetone
3,4'-dichlorobenzalacetone The following examples illustrate the preparation of 4-phosphorinanone reactants of the present invention:

EXAMPLE I

*2,2,6,6-tetramethyl-1-phenyl-4-phosphorinanone*

A mixture of 7.0 grams (0.051 mole) of 2,6-dimethyl-2,5-heptadien-4-one and 5.6 grams (0.051 mole) of phenylphosphine (transferred with a hypodermic syringe) is heated under nitrogen at 115° C.–130° C. for 6 hours. The solution, still yellow green, crystallizes on cooling. Vacuum distillation gives a total of 9.7 grams of yellowish waxy solid. It is soluble in cold benzene, ether chloroform, methanol, 2B alcohol, and acetone, soluble in hot acetonitrile, and insoluble in hot hexane and water.

Sublimation of this yellowish waxy solid gives white crystals of 2,2,6,6-tetramethyl-1-phenyl-4-phosphorinanone.

The following table teaches Examples II to XXXII, carried out essentially as Example I, with temperature modifications:

TABLE I

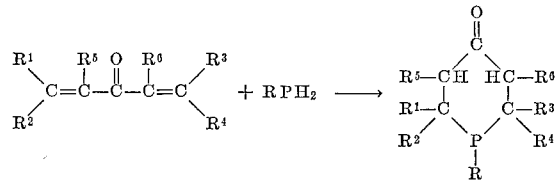

| Example No. | (A) Divinyl ketone | (B) Primary phosphine | Temp., ° C. | (C) Product |
|---|---|---|---|---|
| II | 1,4-hexadien-3-one | Phenylphosphine | 115 | 2-methyl-1-phenyl-4-phosphorinanone. |
| III | 1,4-heptadien-3-one | Cyclohexylphosphine | 180 | 1-cyclohexyl-2-ethyl-4-phosphorinanone. |
| IV | 1,4-octadien-3-one | Isobutylphosphine | 100 | 1-isobutyl-2-propyl-4-phosphorinanone. |
| V | 7-methyl-1,4-octadien-3-one | Methylphosphine | 80 | 2-isobutyl-1-methyl-4-phosphorinanone. |
| VI | 5-methyl-1,4-hexadien-3-one | 2-cyanoethylphosphine | 200 | 1-(2'-cyanoethyl)-2,2-dimethyl-4-phosphorinanone. |
| VII | 5-methyl-1,4-heptadien-3-one | Octylphosphine | 160 | 2-ethyl-2-methyl-1-octyl-4-phosphorinanone. |
| VIII | 5-methyl-1,4-octadien-3-one | Propylphosphine | 90 | 2-methyl-1,2-dipropyl-4-phosphorinanone. |
| IX | 5-ethyl-1,4-heptadien-3-one | Octadecylphosphine | 170 | 2,2-diethyl-1-octadecyl-4-phosphorinanone. |
| X | 5-propyl-1,4-octadien-3-one | Dodecylphosphine | 160 | 1-dodecyl-2,2-dipropyl-4-phosphorinanone. |
| XI | 1-cyclohexylidene 3-buten-2-one | Phenylphosphine | 160 | 1-phenyl-1-phosphaspiro [5.5] undecan-4-one. |
| XII | 5-phenyl-1,4-hexadien-3-one | do | 150 | 2-methyl-1,2-diphenyl-4-phosphorinanone. |
| XIII | 5-(2'-methoxyethyl)-1,4-nonadien-3-one | Octylphosphine | 170 | 2-butyl-2(2'-methoxyethyl)-1-octyl-4-phosphorinanone. |
| XIV | Divinyl ketone | 2-cyanoethylphosphine | 180 | 1-(2'-cyanoethyl)-4-phosphorinanone. |
| XV | 2,5-heptadien-4-one | Pentylphosphine | 110 | 2,6-dimethyl-1-pentyl-4-phosphorinanone. |
| XVI | 2-methyl-2,5-heptadien-4-one | Phenylphosphine | 140 | 2,2,6-trimethyl-1-phenyl-4-phosphorinanone. |
| XVII | 2,6-dimethyl-2,5-heptadien-4-one | Heptadecylphosphine | 150 | 1-heptadecyl-2,2,6,6-tetramethyl-4-phosphorinanone. |
| XVIII | 2,8-dimethyl-3,6-nonadien-5-one | Para-chlorophenyl-phosphine | 175 | 1-parachlorophenyl-2,6-diisopropyl-4-phosphorinanone. |
| XIX | 4,6-dimethyl-3,7-diethyl-3,6-nonadien-5-one | Phenylphosphine | 150 | 2,2,6,6-tetraethyl-3, 5-dimethyl-1-phenyl-4-phosphorinanone. |
| XX | 2,4-dipropyl-1,4-pentadien-3-one | do | 150 | 1-phenyl-3,5-dipropyl-4-phosphorinanone. |
| XXI | 3,7-diethyl-3,6-nonadien-5-one | 2'-ethoxyethylphosphine | 130 | 1-(2'-ethoxyethyl)-2,2,6,6-tetraethyl-4-phosphorinanone. |
| XXII | 5-methyl-9-ethyl-4, 7-tridecadien-6-one | Heptadecylphosphine | 150 | 2-ethylpentyl-6-propyl-1-heptadecyl-4-phosphorinanone. |
| XXIII | Dibenzalacetone | Phenylphosphine | 120 | 1,2,6-triphenyl-4-phosphorinanone. |
| XXIV | 4,4'-dichlorodibenzalacetone | Octylphosphine | 160 | 2,6-di(4'-chlorophenyl)-1-octyl-4-phosphorinanone. |
| XXV | 4,4'-dimethyldibenzalacetone | 2-cyanoethyl-phosphine | 175 | 1-(2'-cyanoethyl)-2,6-di-(4''-methylphenyl)-4-phosphorinanone. |
| XXVI | Dicuminylideneacetone | Propylphosphine | 115 | 1-propyl-2,6-di-isopropylphenyl-4-phosphorinanone. |
| XXVII | 2-chlorodibenzalacetone | Cyclohexylphosphine | 120 | 2-chlorophenyl-1-cyclohexyl-6-phenyl-4-phosphorinanone. |
| XXVIII | 3-chlorodibenzalacetone | 2-ethoxyethylphosphine | 110 | 2-(3'-chlorophenyl)-1-(2''-ethoxyethyl)-6-phenyl-4-phosphorinanone. |
| XXIX | 4-chlorodibenzalacetone | Decylphosphine | 170 | 2-(4'-chlorophenyl)-1-decyl-6-phenyl-4-phosphorinanone. |
| XXX | 2,3'-dichlorodibenzalacetone | Phenylphosphine | 150 | 2-(2'-chlorophenyl)-6-(3''-chlorophenyl)-1-phenyl-4-phosphorinanone. |
| XXXI | 2,4'-dichlorodibenzalacetone | 2-butoxyethylphosphine | 115 | 1-(2'-butoxyethyl)-2-(2''-chlorophenyl)-6-(4'''-chlorophenyl)-4-phosphorinanone. |
| XXXII | 3,4'-dichlorodibenzalacetone | Undecylphosphine | 120 | 2-(3'-chlorophenyl)-6-(4''-chlorophenyl)-1-undecyl-4-phosphorinanone. |

The 4-phosphorinanone reactants prepared as above may be converted to the products of the present invention according to the following typical and conventional processes:

EXAMPLE 1

*2,2,6,6-tetramethyl-1-phenyl-4-phosphorinanone-1-sulfide*

A benzene solution of 1.8 grams of 2,2,6,6-tetramethyl-1-phenyl-4-phosphorinanone and 0.28 gram of sulfur is heated at 80° C. for 30 minutes. Recrystallization of the product from methanol and hexane yields 2,2,6,6-tetramethyl-1-phenyl-4-phosphorinanone-1-sulfide melting at 138° C.–139° C.

EXAMPLE 2

*1-ethyl-1-methyl-4-oxophosphorinanium iodide*

A mixture of 0.4 gram of 1-ethyl-4-phosphorinanone and 4 grams of methyl iodide in 20 milliliters of ether under a nitrogen atmosphere gives a white precipitate on standing. The compound 1-ethyl-1-methyl-4-oxophosphorinanium iodide results. After recrystallization from acetane (1 gram/130 milliliters) its melting point is 213° C.–214° C.

EXAMPLE 3

*1,2,6-triphenyl-4-phosphorinanone, semicarbazone*

A mixture of 0.4 gram semicarbazide hydrochloride and anhydrous potassium carbonate is added to a slurry of 0.9 gram of 1,2,6-triphenyl-4-phosphorinanone in 10 milliliters of 2B alcohol and 1 milliliter of water, the resulting mixture warmed for 10 minutes, cooled and diluted with water. The yield of 1,2,6-triphenyl-4-phosphorinanone, semicarbazone, product is 100% after recrystallization from 2B ethanol.

EXAMPLE 4

*1-heptadecyl-2,2,6,6-tetramethyl-4-phosphorinanone, phenylhydrazone*

One part of 1-heptadecyl-2,2,6,6-tetramethyl-4-phosphorinanone, one part phenylhydrazine and 20 parts of ethanol are mixed and heated to boiling under nitrogen. A drop of glacial acetic acid is added after several minutes. Water is then added until solution is cloudy, then the solution is cooled and filtered thus recovering the product 1-heptadecyl-2,2,6,6-tetramethyl-4-phosphorinanone, phenylhydrazone.

EXAMPLE 5

*2-methyl-1-phenyl-4-phosphorinanone, para-nitrophenylhydrazone*

Example 4 is repeated in every essential respect substituting the ketone and hydrazine reactant with 2-methyl-1-phenyl-4-phosphorinanone and para-nitrophenylhydrazine, respectively.

EXAMPLE 6

*2,2,6-trimethyl-1-phenyl-4-phosphorinanone, oxime*

One part hydroxylamine hydrochloride is dissolved in 6 parts of $H_2O$. To this is added 4 parts of 10% NaOH solution and 0.4 part 2,2,6-trimethyl-1-phenyl-4-phosphorinanone. The resulting mixture is warmed for 10 minutes on a steam bath, cooled and the resulting 2,2,6-trimethyl-1-phenyl-4-phosphorinanone oxime product crystals filtered off.

Examples 1, 2, 3, 4, 5 and 6 are repeated in every essential respect substituting the respective 4-phosphorinanone reactants as indicated in the following table.

TABLE II

| Example No. | Reactant 4-Phosphorinanone | Other Reactant | Temperature, °C. | Reaction according to example— | Product |
|---|---|---|---|---|---|
| 7 | 1-cyclohexyl-2-ethyl-4-phosphorinanone. | Excess heptyl bromide. | 50 | 2 | 1-cyclohexyl-1-heptyl-2-ethyl-4-phosphorinanium bromide. |
| 8 | 1-dodecyl-2,2-dipropyl-4-phosphorinanone. | Excess benzyl chloride. | 80 | 2 | 1-benzyl-1-dodecyl-2,2-dipropyl-4-phosphorinanium chloride. |
| 9 | 2-butyl-2(2′-methoxyethyl)-1-octyl-4-phosphorinanone. | Dodecyl iodide. | 35 | 2 | 2-butyl-1-dodecyl-2(2′-methoxyethyl)-1-octyl-4-phosphorinanium iodide. |
| 10 | 2,2,6,6-tetraethyl-3,5-dimethyl-1-phenyl-4-phosphorinanone. | Propyl bromide. | 24 | 2 | 2,2,6,6-tetraethyl-3,5-dimethyl-propyl-1-phenyl-4-phosphorinanium chloride. |
| 11 | 1-propyl-2,6-diisopropylphenyl-4-phosphorinanone. | Sulfur. | 50 | 1 | 1-propyl-2,6-di-isopropylphenyl-4-phosphorinanone-1-sulfide. |
| 12 | 1-(2′-ethoxyethyl)-2,2,6,6-tetraethyl-4-phosphorinanone. | ...do... | 110 | 1 | 1-(2′-ethoxyethyl)-2,2,6,6-tetraethyl-4-phosphorinanone-1-sulfide. |
| 13 | 2,2-diethyl-1-octadecyl-4-phosphorinanone. | Phenylhydrazine. | 60 | 4 | 2,2-diethyl-1-octadecyl-4-phosphorinanone, phenylhydrazone. |
| 14 | 2-isobutyl-1-methyl-4-phosphorinanone. | Para-nitrophenylhydrazine. | 78 | 5 | 2-isobutyl-1-methyl-4-phosphorinanone, para-nitrophenylhydrazone. |
| 15 | 1-phenyl-3,5-dipropyl-4-phosphorinanone. | Semicarbazide HCl and anhydrous potassium carbonate. | 70 | 3 | 1-phenyl-3,5-dipropyl-4-phosphorinanone, semicarbazone. |
| 16 | 2-methyl-1,2-diphenyl-4-phosphorinanone. | Hydroxylamine hydrochloride and base. | 90 | 6 | 2-methyl-1,2-diphenyl-4-phosphorinanone, oxime. |

The sulfide derivatives of the present invention are best produced by reacting stoichiometric amounts of sulfur and the 4-phosphorinanone reactant at temperatures in the range of 50° C. to 150° C. and in the presence of an inert organic solvent. Usually the reaction is carried out at a temperature below the boiling point of the solvent. Typical solvents are aromatic hydrocarbons, e.g., benzene, toluene, xylene, and the like. The resulting product is recovered by recrystallization. The 4-oxophosphorinanium halides are generally produced by reacting stoichiometric amounts of an alkyl halide and a 4-phosphorinanone in a nitrogen atmosphere and in the presence of an ether solvent, or excess alkyl halide, at a temperature in the range of 0° C. to 80° C., preferably temperatures below the boiling point of the ether solvent when used.

The semicarbazone derivatives of the present invention are usually carried out by reacting semicarbazide hydrochloride with a weak inorganic or organic base, such as potassium carbonate, sodium acetate, and the like, in the presence of a lower alkanol and at a temperature in the range of 40° C. to 100° C.

As to the phenylhydrazone derivatives of the instant discovery, the production thereof is generally accomplished by reacting a phenylhydrazine with a 4-phosphorinanone under nitrogen and in the presence of a lower alkanol. Temperatures in the range of 50° C. to 100° C. are generally employed.

The para-nitro-phenylhydrazone derivatives are produced in the same manner as the phenylhydrazone derivatives, save that para-nitro-phenylhydrazine is used in lieu of phenylhydrazine.

The oxime derivatives of the present invention are prepared as in Example 4, above, using hydroxylamine hydrochloride and an equivalent amount, basis the hydroxylamine hydrochloride, of alkali metal hydroxide. The solvent used is water and temperatures in the range of 50° C. to 100° C. are employed.

The 4-phosphorinanone derivatives of the present invention have direct utility as gasoline additives. For example, up to about 10 milliliters of any one of these derivatives, when dissolved in one gallon of gasoline, affords protection against misfiring, surface ignition, and the like.

Clearly, the instant discovery encompasses numerous modifications within the skill of the art. Consequently,

I claim:
1. A 4-phosphorinanone-1-sulfide of the formula

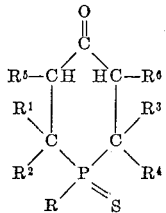

wherein R is a member selected from the group consisting of substituted and unsubstituted, branched and straight chain alkyl having from 1 to 18 carbon atoms, cycloalkyl, substituted and unsubstituted aryl; said substituents for alkyl being selected from the group consisting of lower alkoxy, phenyl and cyano, and said substituents for aryl being selected from the group consisting of halogen and lower alkyl; $R^1$, $R^2$, $R^3$ and $R^4$ each represent a member selected from the group consisting of hydrogen, lower alkyl, phenyl, chloro-substituted phenyl, lower alkyl-substituted phenyl, cyclohexyl and lower alkoxyalkyl; and $R^5$ and $R^6$ each represent a member selected from the group consisting of hydrogen, lower alkyl and phenyl.

2. 2,2,6,6 - tetramethyl - 1-phenyl - 4 - phosphorinanone-1-sulfide.

References Cited by the Examiner
UNITED STATES PATENTS

| | | | |
|---|---|---|---|
| 2,855,435 | 10/1958 | Grillot et al. | 260—554 |
| 2,875,249 | 2/1959 | Stansbury et al. | 260—586 |
| 2,898,375 | 8/1959 | Guex et al. | 260—586 |
| 2,903,482 | 9/1959 | Hopff et al. | 260—566 |
| 2,959,615 | 11/1960 | Lum et al. | 260—554 |
| 2,975,213 | 3/1961 | Layer | 260—566 |

TOBIAS E. LEVOW, *Primary Examiner.*

IRVING MARCUS, *Examiner.*

H. R. JILES, F. R. OWENS, *Assistant Examiners.*